(12) United States Patent
Kobachi et al.

(10) Patent No.: US 6,326,948 B1
(45) Date of Patent: *Dec. 4, 2001

(54) INPUT DEVICE

(75) Inventors: Mitsuo Kobachi, Mie-ken; Akihiro Fujita, Nara-ken, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,219

(22) Filed: Jan. 13, 1998

(30) Foreign Application Priority Data

Jan. 20, 1997 (JP) .................................... 9-008110

(51) Int. Cl.$^7$ .................................... G09G 5/08
(52) U.S. Cl. .................... 345/157; 345/158; 345/159; 345/160; 345/161; 345/165; 345/166
(58) Field of Search ..................... 345/156, 161, 345/166, 160, 159, 184, 157, 162, 163, 165

(56) References Cited

U.S. PATENT DOCUMENTS

| | | | |
|---|---|---|---|
| 5,355,148 | * | 10/1994 | Anderson .................. 345/166 |
| 5,432,530 | | 7/1995 | Arita et al. ................ 345/159 |
| 5,504,502 | * | 4/1996 | Arita et al. ................ 345/160 |

FOREIGN PATENT DOCUMENTS

| | | |
|---|---|---|
| 556936 | 8/1993 | (EP) . |
| 4 333913 | 11/1992 | (JP) . |
| 5 324186 | 12/1993 | (JP) . |
| 7 117875 | 12/1995 | (JP) . |
| 8 263198 | 10/1996 | (JP) . |
| 9 16325 | 1/1997 | (JP) . |
| WO9631836 | 10/1996 | (WO) . |

* cited by examiner

Primary Examiner—Richard Hjerpe
Assistant Examiner—Ali A. Zamani

(57) ABSTRACT

The input device of the present invention includes: a base having a slide surface; a movable body slidable on the slide surface; a light-emitting element for emitting light; a reflective portion which is provided for the movable body and has a reflective surface for reflecting the light emitted by the light-emitting element; and a plurality of light-receiving elements for receiving the light reflected by the reflective portion.

45 Claims, 18 Drawing Sheets

Movement direction

Movement direction

FIG.21A
FIG.21B
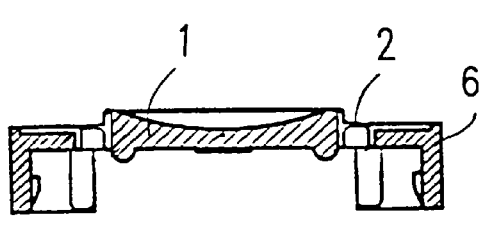
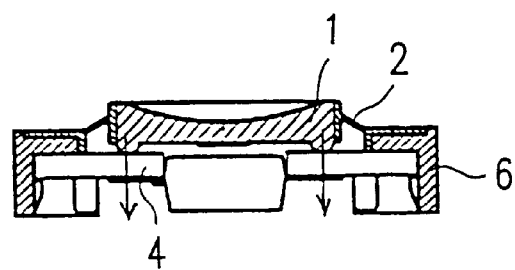
Press direction of
elastic body of rubber

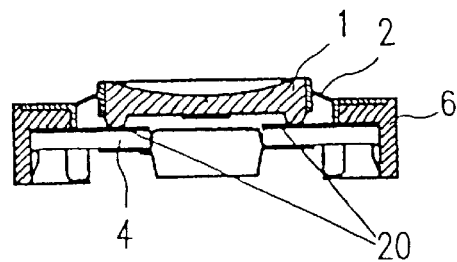
FIG.24
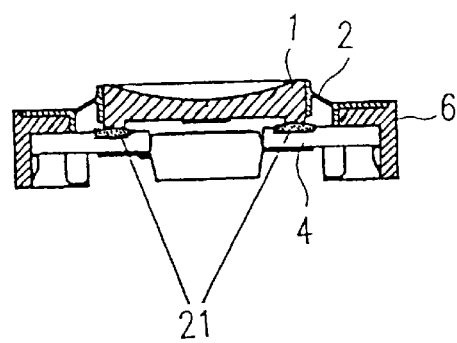
FIG.25
FIG.26A
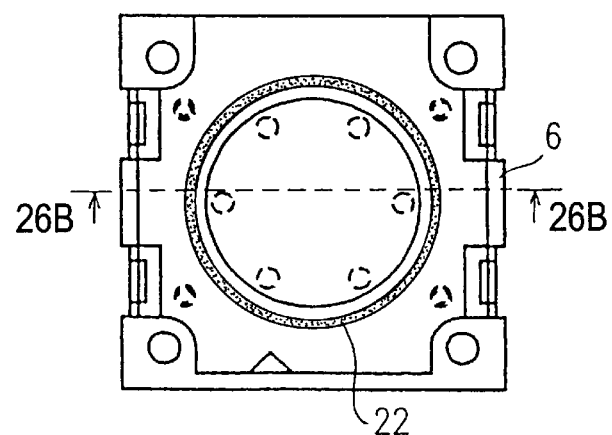
FIG.26B
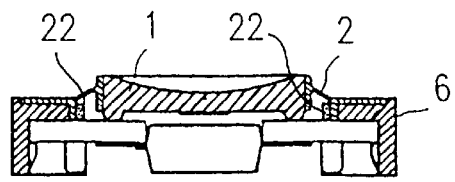

← Direction of elastic force

← Direction of elastic force

FIG.31
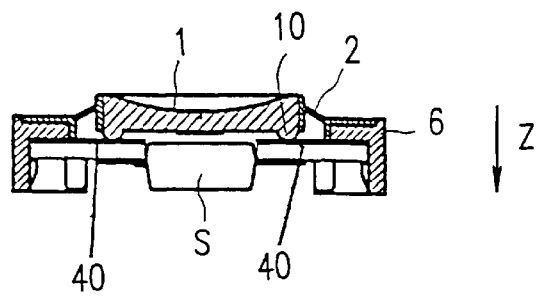
FIG.32A
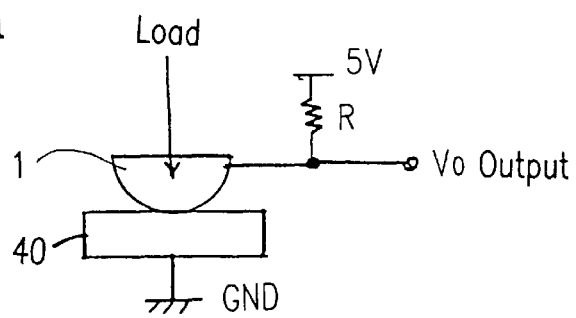
FIG.32B
FIG.33
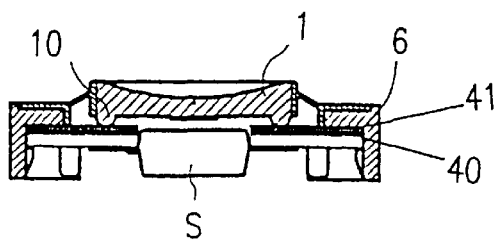

INPUT DEVICE

BACKGROUND OF THE INVENTION

1. Field of the Invention

The present invention relates to an input device which can perform a two-dimensional or three-dimensional input operation by moving a cursor on a screen for personal computers, entertainment systems, portable terminal units and the like. More specifically, the present invention relates to technologies allowing for downsizing, reduction in thickness of and improvement of the operating performance of an input device.

2. Description of the Related Art

Various input devices are known for display devices such as those for personal computers (hereinafter, such input devices will also be referred to as "pointing devices"). These pointing devices have various types of operating systems including a resistive pressure-sensitive system, a distortion system, an electrostatic capacitive system, and a membrane switch. However, each of these types of pointing devices has its own advantages and disadvantages, and no pointing device has been found which can simultaneously meet the requirements of excellent operating performance, reliability (environment resistance) and durability. Thus, a strong demand exists for a pointing device that can simultaneously meet these requirements.

In order to satisfy such a demand, the present applicant developed improved applications of optical pointing devices (Japanese Patent Applications Nos. 7-66071 and 7-161157).

The pointing device disclosed in Japanese Patent Application No. 7-66071 is a highly reliable and durable pointing device which can optically perform a two-dimensional input operation without requiring any contact for performing a detection. The pointing device is also excellent in operating performance because the pointing device uses an elastic structure made of rubber.

FIG. 34 schematically illustrates the detection principles of the pointing device. The pointing device includes: an operating portion 101 which is operated by the tip of a finger of an operator; a fixing portion 106; an elastic structure 102 for elastically supporting the operating portion 101 and for connecting the operating portion 101 and the fixing portion 106 to each other; a reflective plate 103 which is disposed on the lower surface of the operating portion 101; a single light-emitting element 104; four light-receiving elements 105; and a sensor portion which is fixed below the operating portion 101.

The light emitted upward from the light-emitting element 104 is reflected by the reflective plate 103 so as to be detected by the light-receiving elements 105. As shown in FIG. 34, when the operating portion 101 is moved to any of forward, backward, leftward and rightward directions, the position of the light (i.e., the location of the light spot) received by the light-receiving elements 105 is varied, so that the amounts of the light received by the four light-receiving elements 105, i.e., photodiodes PD1 to PD4, are also varied. The pointing device utilizes this principle for determining the direction and the amount of displacement of the operating portion 101, that is to say, the movement direction and the movement distance of a cursor 111 of a computer 110 or the like, in accordance with the equations shown in FIG. 34. In other words, this pointing device may function as an input device for the cursor 111.

On the other hand, the pointing device described in Japanese Patent Application No. 7-161157 is a pointing device which can perform a three-dimensional input operation. The pointing device can also perform a two-dimensional input operation (i.e., an operation performed in an X direction and a Y direction) by utilizing substantially the same configuration as that of the previously described pointing device. In performing the three-dimensional input operation, the pointing device calculates the movement amount of a cursor in a Z direction in accordance with the increase of the size of a spot of light received by the light-receiving elements when the operating portion is pushed downward. The size of the light spot is increased because the reflective plate 123 is also pushed down as the operating portion is pushed down, as shown in FIG. 35. In addition, since the increase of the size of the light spot varies the total amount of light to be detected by the four light-receiving elements, the pointing device can easily calculate the coordinate of the cursor in the Z direction.

Although the above input devices preform adequately, further improvements in operating performance reliability (environment resistance), durability and size reduction would be desirable.

SUMMARY OF THE INVENTION

The present invention provides an input device which is easy to use, durable, reliable, provides improved operating performance and has a reduced size.

The input device of the present invention includes: a base having a slide surface; a movable body slidable on the slide surface; a light-emitting element for emitting light; a reflective portion which is provided for the movable body and has a reflective surface for reflecting the light emitted by the light-emitting element; and a plurality of light-receiving elements for receiving the light reflected by the reflective portion.

In one embodiment, the movable body is supported by an elastic structure including an elastic body which expands/shrinks with a sliding movement of the movable body, and the elastic structure is linked to the base.

In another embodiment, the input device further includes a fixing portion having a guide portion for guiding the movement of the movable body such that the movable body is slidable on the slide surface. The movable body is supported by an elastic structure including an elastic body which expands/shrinks with the sliding movement of the movable body. The elastic structure is linked to the fixing portion.

In still another embodiment, the elastic body is a spiral spring.

In still another embodiment, the plurality of light-receiving elements detect the light reflected by the reflective surface onto a first plane, and a spot diameter x of the light reflected by the reflective surface onto the first plane satisfies a relationship: $d \leq x \leq 2r+2l_{max}$, where d is a distance between two adjacent light-receiving elements of the plurality of light-receiving elements; r is a diameter of a circle encircling and inscribing the plurality of light-receiving elements; and $l_{max}$ is a maximum movement distance of the movable body.

In still another embodiment, the reflective surface has a reflection pattern. When the reflected light is imaged by the plurality of light-receiving elements, the reflection pattern is turned into an imaging pattern which is symmetric in any of the upward, downward, leftward and rightward directions with respect to the light-receiving surfaces of the light-receiving elements.

In still another embodiment, the reflective surface has a reflection pattern in which a reflectivity in a center of the reflective surface is different from a reflectivity in an outer periphery of the reflective surface.

In still another embodiment, the operating portion includes at least one protrusion.

In still another embodiment, the operating portion includes an anti-slipping film.

In still another embodiment, at least one mark indicating an operation direction of the operating portion is provided for the movable body.

In still another embodiment, the mark is one of a convex one and a concave one which is formed when the movable body is molded from a resin.

In still another embodiment, the mark is one of a picture, a character and a pattern.

In still another embodiment, an indicator of a pointing device is provided for the movable body.

In still another embodiment, the material of the elastic structure is the same as that of the movable body.

In still another embodiment, the material of the elastic structure is the same as that of the fixing portion.

In still another embodiment, the material of the elastic structure is the same as that of the operating portion.

In still another embodiment, the movable body comes into contact with the base in accordance with a force applied by the elastic structure.

In still another embodiment, the movable body includes at least three protrusions contacting the base. The at least three protrusions are one of spherical and hemispherical.

In still another embodiment, the base includes at least three protrusions contacting the movable body. The at least three protrusions are one of spherical and hemispherical.

In still another embodiment, a flat plate is provided between the movable body and the base such that the movable body smoothly slides relative to the base.

In still another embodiment, a lubricant is applied between the movable body and the base such that the movable body smoothly slides on the base.

In still another embodiment, a stopper portion for restricting the movement of the movable body is provided for the base.

In still another embodiment, the light-emitting element and the plurality of light-receiving elements are fixed on the base.

In still another embodiment, the movable body moves in two dimensional directions.

In still another embodiment, the input device further includes a pressure-sensitive sensor for detecting a force applied to the movable body in a Z-axis direction. The slide surface includes an X axis and a Y axis orthogonal to the X axis, and the Z axis is orthogonal to the X axis and the Y axis.

In still another embodiment, the position of an object to be displayed on a display device is controlled in response to a detection signal output by the pressure-sensitive sensor.

In still another embodiment, a flat plate is disposed between the movable body and the base such that the movable body smoothly slides relative to the base. The pressure-sensitive sensor is disposed between the flat plate and the base.

In still another embodiment, the pressure-sensitive sensor is disposed at a contact between the movable body and the base.

In still another embodiment, the input device starts to operate as a pointing device in response to a detection signal output by the pressure-sensitive sensor.

In still another embodiment, the slide surface is planar.

In still another embodiment, the slide surface is curved.

In still another embodiment, the operating portion is concave.

In still another embodiment, the operating portion is convex.

In still another embodiment, the at least one mark is colored.

In still another embodiment, the elastic structure, the fixing portion and the movable body are molded by either one of an insert molding technique and a two-color molding technique, and form a hermetic structure under an upper surface of the movable body.

In still another embodiment, when the elastic structure, the fixing portion and the movable body are molded by either one of the insert molding technique and the two-color molding technique, at least a part of the surface of the movable body is covered with the same material as that of the elastic structure.

In still another embodiment, the movable body includes an operating portion to which a force is applicable by an operator.

In still another embodiment, the material of the elastic structure is the same as that of the operating portion, and the material of the elastic structure is the same as that of the fixing portion.

In still another embodiment, the movable body is pressed against the base by a force applied by the elastic structure.

In still another embodiment, the light-emitting element and the plurality of light-receiving elements are integrally molded with the base.

In still another embodiment, the base has an upper surface and a lower surface, and the pressure-sensitive sensor is placed on either one of the upper surface and the lower surface of the base.

In still another embodiment, the pressure-sensitive sensor is disposed on a part of the movable body which is in contact with the base.

In still another embodiment, the start signal is output to a computer having a power save function.

Hereinafter, the functions or the effects to be attained by the present invention will be described.

The input device of the present invention is an optical input device of a non-contact type, and thus provides excellent durability. In addition, the input device provides excellent reliability (or environment resistance).

Moreover, the movable body (operating portion) can slide two-dimensionally (i.e., in the X and Y directions). Thus, as compared with an input device which rocks in the vertical direction, the input device (i.e., the pointing device) can be downsized with a reduced thickness.

Furthermore, in the above-described configuration, the reflective surface moves with the movable body (i.e., the operating portion) and is disposed so as to face the light-emitting element and the light-receiving elements. Thus, by providing the above-described characteristics for the reflection pattern thereof, a pointing device exhibiting linear detection characteristics over a wide range with respect to the displacement can be easily realized. As a result, an input device which can perform a two-dimensional input operation with improved detection precision and enhanced operating performance can be realized.

Furthermore, in the above-described configuration, the tip of an operator's finger does not slip on the operating portion.

Thus, the operator can easily apply force with certainty to the operating portion. As a result, the operating performance is further improved.

Moreover, if the indicators indicating the operating directions and the like are provided for the operating portion by using colored marks, pictures or the like, then the operator is much less likely to perform an erroneous operation. As a result, the operating performance is further improved.

In addition, if the elastic structure, the operating portion and the fixing portion are formed by an insert molding technique, a two-color molding technique or the like so as to realize a hermetic structure under the surface of the operating portion, then a dustproof construction is realized. As a result, the reliability (environment resistance) of the input device can be improved.

Furthermore, if the elastic structure, the operating portion and the fixing portion are positioned and configured to satisfy such a positional relationship that the operating portion comes into contact with or is pressed against the base by the force applied by the elastic structure when the elastic structure, the operating portion and the fixing portion are fixed onto the base, then various assembly defects such as backlash and lifting of the operating portion and the fixing portion can be eliminated. As a result, the assembly precision can be improved and the costs can be reduced.

Moreover, if the movable body (operating portion) and the base are in contact with each other via at least three spherical protrusions or hemispherical protrusions, then the slide resistance of the operating portion against the base can be reduced. As a result, the operating performance is further improved.

Furthermore, if a sheet-shaped flat plate is provided or a lubricant is applied between the operating portion and the base for smoothly sliding the operating portion, then the slide resistance can be further reduced. As a result, the operating performance is further improved.

Moreover, if a pressure-sensitive sensor for detecting the force in the Z-axis direction which is applied onto the movable body is further provided, an input device which can perform a three-dimensional input operation, while attaining all the advantages of the input device for the two-dimensional input operation, is realized.

In such a case, since the pressure-sensitive sensor can precisely detect a force applied in the Z-axis direction, it is not necessary to perform a subtle input operation in the Z direction while relying on the human sense of touching or subtly pushing down the operating portion with the tip of a finger. Thus, since such an operation requires no special training, even a child or an old man can easily perform a three-dimensional input operation.

Thus, the invention described herein makes possible the advantages of (1) providing an input device such as a pointing device which can perform a two-dimensional and/ or a three-dimensional input operation, can be downsized with a reduced thickness and can improve the operating performance thereof, and (2) providing an input device which enables even a child to easily perform the three-dimensional input operation without requiring any special training.

These and other advantages of the present invention will become apparent to those skilled in the art upon reading and understanding the following detailed description with reference to the accompanying figures.

BRIEF DESCRIPTION OF THE DRAWINGS

FIG. 21A is a cross-sectional view illustrating an assembly in which the elastic structure 2, the operating portion 1 and the fixing portion 6 have been assembled, and FIG. 21B is a cross-sectional view illustrating the appearance of the input device after the base 4 has been attached to the assembly shown in FIG. 21A.

FIG. 24 is a front cross-sectional view illustrating the input device of Example 3 for improving the slidability of the operating portion.

FIG. 25 is a front cross-sectional view illustrating the input device of Example 4 for improving the slidability of the operating portion.

FIG. 26A is a plan view illustrating an assembly in which the elastic structure 2, the operating portion 1 and the fixing portion 6 have been assembled, and FIG. 26B is a cross-sectional view taken along the broken line D—D of the assembly shown in FIG. 26A.

FIG. 31 is a cross-sectional view illustrating the input device of the present invention according to input device Example 5.

FIG. 32A is a schematic circuit diagram illustrating the detection principle of a pressure-sensitive sensor, and FIG. 32B is a graph illustrating a relationship between an applied load and an output voltage.

FIG. 33 is a cross-sectional view illustrating the input device of the present invention according to input device Example 6.

DESCRIPTION OF THE PREFERRED EMBODIMENTS

Herein after, several embodiments of the present invention will be specifically described in the following examples with reference to the accompanying drawings.

INPUT DEVICE EXAMPLE 1

FIGS. 1 through 12 illustrate an embodiment of the input device of the present invention according to input device Example 1. In input device Example 1, the present invention is applied to a pointing device which can perform a two-dimensional input operation.

As shown in FIGS. 1 to 6, the pointing device P includes: a square-shaped base 4 when it is seen from above; an operating portion 1, i.e., a movable body which can slide on the base 4 in an X-axis direction (corresponding to the lateral direction in FIG. 1) and in a Y-axis direction (corresponding to the depth direction in FIG. 1) which is orthogonal to the X-axis direction; a fixing portion 6 provided along the periphery of the base 4; an elastic structure 2 which elastically supports the operating portion 1 and connects the operating portion 1 to the fixing portion 6; and a sensor S which is placed under a lower surface of the operating portion 1 between the base 4 and the operating portion 1 and is electrically and mechanically connected to the base 4. The operating portion 1 is formed in a disk shape with a concave portion formed in a center region of an upper surface thereof. The elastic structure 2 includes elastic bodies such as blade springs.

Figure 2:
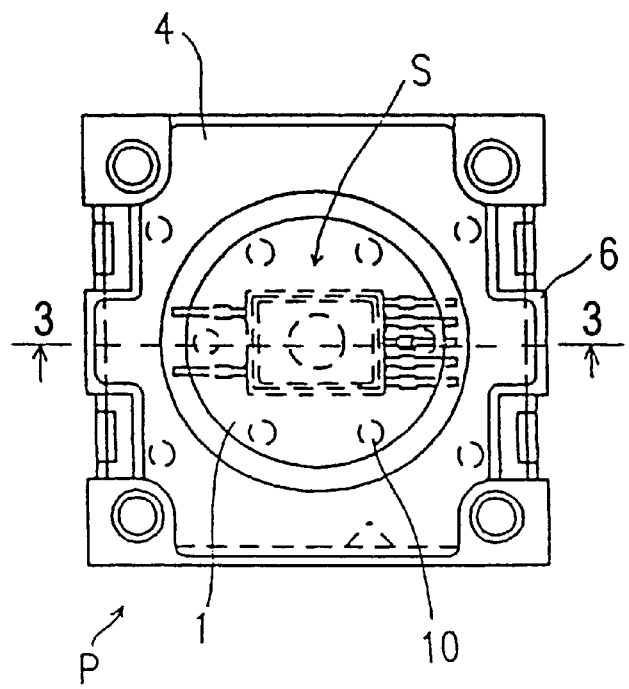
FIG. 2 is a plan view illustrating the input device of the present invention according to input device Example 1.
Figure 3:
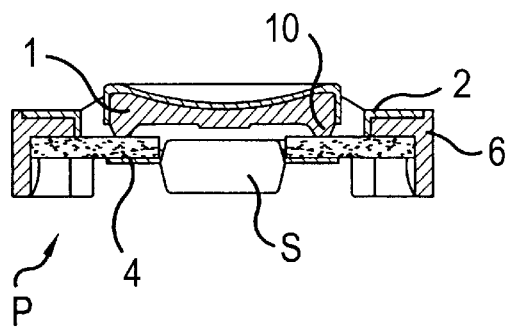
FIG. 3 is a cross-sectional view taken along the line A—A shown in FIG. 2.
Figure 4:
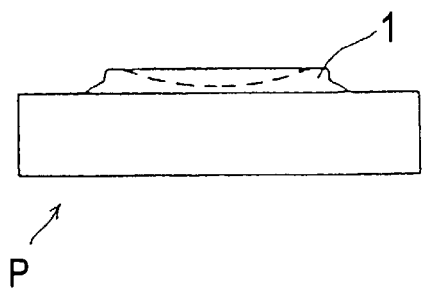
FIG. 4 is a side view illustrating the input device of the present invention according to input device Example 1.
Figure 5:
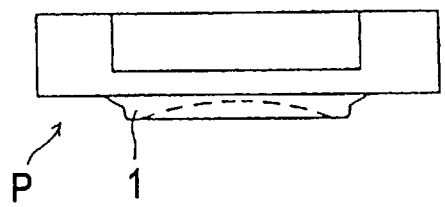
FIG. 5 is a rear view illustrating the input device of the present invention according to input device Example 1.
Figure 6:
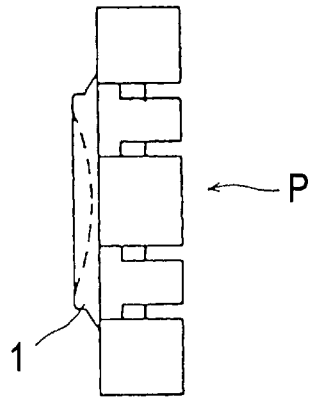
FIG. 6 is a right side view illustrating the input device of the present invention according to input device Example 1.

In addition, six protrusions 10 are formed on the lower surface of the operating portion 1 so as to come into contact with an upper surface of the base 4 as shown in FIG. 2. These protrusions 10 are provided for reducing the slide resistance between the operating portion 1 and the base 4 and for improving the operating performance thereof. Furthermore, a reflective plate 3 for reflecting downward the light emitted by a light-emitting element to be described later is formed in the center region on the lower surface of the operating portion 1.

Herein, the light reflective detector previously suggested by the present applicant in Japanese Patent Application No. 8-75008 is used as the sensor S. The light reflective detector includes a single light-emitting element (light-emitting diode LD) and four light-receiving elements (hereinafter, referred to as "photodiodes" PD1 to PD4) which are disposed over or under the light-emitting element LD. The base 4 is a printed wiring board (PWB) and the sensor S is soldered to the base 4 so as to be electrically connected thereto. Alternatively, the sensor S may be integrally molded and fixed with the base 4. Furthermore, the sensor S may also be molded so as to simultaneously function as the base 4. The elastic structure 2 is made of a material such as rubber.

In the above-described configuration, when an operator places the tip of his finger on the concave portion of the operating portion 1 and applies some force thereto, the operating portion 1 slides in the direction in which the force is applied. In this case, the reflective plate 3 is also moved in the same direction in accordance with the movement of the operating portion 1.

The light emitted upward by the light-emitting element LD of the sensor S is reflected downward by the reflective plate 3. The reflected light is received by the four photodiodes PD1 to PD4 (see FIGS. 7A and 7B), which photoelectrically convert the received light and then output electric signals corresponding to the amount of the received light. Herein, when the operating portion 1 slides, the total amount of the light received by the four photodiodes PD1 to PD4 is varied. According to the present invention, the direction and the amount of the two-dimensional movement of the operating portion 1 are detected by paying particular attention to this variation.

Next, the principle of how the two-dimensional movement of the operating portion 1 is detected will be described with reference to FIGS. 7A, 7B and 8. As described above, the light emitted by the light-emitting element is reflected by the reflective plate 3, thereby forming a light spot over the four photodiodes PD1 through PD4.

Figure 7A:
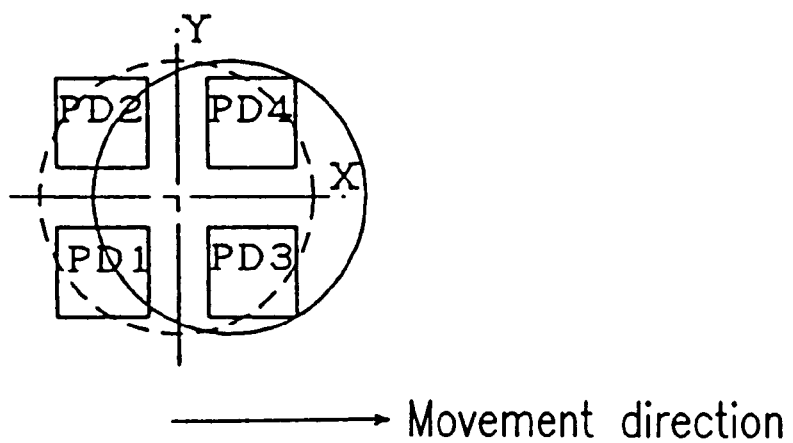
FIG. 7A is a diagram illustrating a relationship between the movement direction of an operating portion and that of a light spot in the X-axis direction.

For example, it is assumed that a light spot is located as indicated by the broken line in FIG. 7A in the initial state where the operating portion 1 is not displaced. In such a case, when an operator moves the operating portion 1 in the positive direction of the X direction with a finger, the light spot is also moved in the same positive direction of the X direction.

Figure 7B:
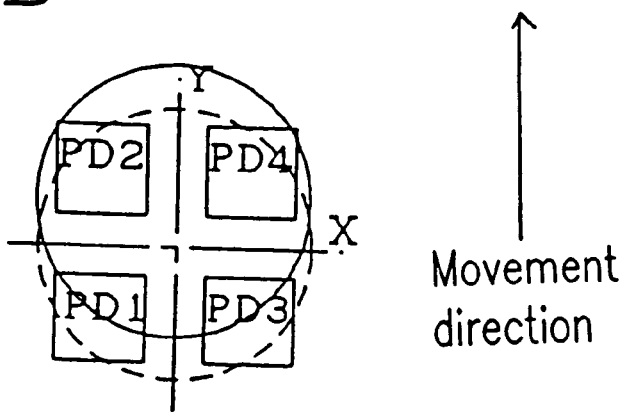
FIG. 7B is a diagram illustrating a relationship between the movement direction of the operating portion and that of the light spot in the Y-axis direction in the input device of the present invention according to input device Example 1.

Similarly, in the initial state as indicated by the broken line in FIG. 7B, when the operator moves the operating portion 1 in the positive direction of the Y direction with a finger, the light spot is also moved in the same positive direction of the Y direction.

Figure 8:
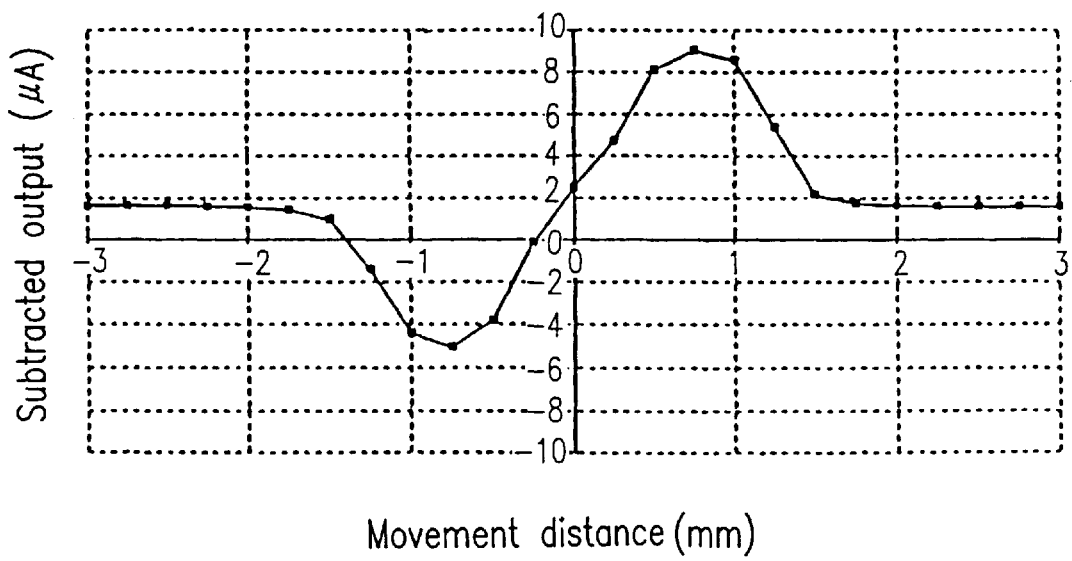
FIG. 8 is a graph illustrating a relationship between a movement distance and a subtracted output.

Exemplary data about the movement amount of the operating portion 1 in the X-axis and the Y-axis directions and subtracted outputs in such a case are shown in FIG. 8.

The subtracted output may be calculated in the following manner.

Assuming that the photo current values of the photodiodes PD1 through PD4 are represented by Isc(PD1), Isc(PD2), Isc(PD3) and Isc(PD4), respectively, the subtracted output AX in the X-axis direction is given by the following Equation (1).

$$AX = Isc(PD3) + Isc(PD4) - \{Isc(PD1) + Isc(PD2)\} \quad (1)$$

Similarly, the subtracted output AY in the Y-axis direction is given by the following Equation (2).

$$AY = Isc(PD2) + Isc(PD4) - \{Isc(PD1) + Isc(PD3)\} \quad (2)$$

As described above, an S-shaped curve such as that shown in FIG. 8 is obtained by the pointing device of the present invention for the X-axis direction and the Y-axis direction. By synthesizing the vectors of the output X in the X-axis direction and the output Y in the Y-axis direction, the data about the two-dimensional direction within the range of 360° and the amount and the speed of an arbitrary movement are produced. As a result, the pointing device of the present invention can perform an input operation for a display device for a computer or the like.

However, it should be noted that in order to move the light spot in the same direction as the movement direction of the operating portion 1 and to obtain the relationship shown in FIG. 8 between the movement distance and the subtracted output, the sensor S and the reflective plate 3 are required to be configured so as to satisfy such a positional relationship that the operating portion 1 is moved in a plane perpendicular to the optical axis of the light-emitting element.

Next, an exemplary reflector as the reflective plate 3 will be described in detail. According to the present invention, in order to reflect the light emitted by the light-emitting element and to form a uniform imaging pattern in all directions (including upward, downward, leftward and rightward directions) on the surface of the light-receiving elements (i.e., the photodiodes PD1 to PD4) when the reflected light is imaged by the light-receiving elements, the reflection pattern of the reflective plate 3 is selected to be a circle shape or a square shape which is two-dimensionally symmetrical in all directions (including upward, downward, leftward and rightward directions). The reflection pattern is two-dimensionally symmetrical with respect to the optical axis of the light which has been emitted by the light-emitting element and vertically incident on the reflective plate 3.

The reflective plate 3 is fabricated by a metal evaporation technique in many cases. Alternatively, the reflective plate 3 may also be formed as a reflective seal, a reflective coating or the like.

Moreover, in order to enlarge the region in which the relationship between the subtracted output and the movement distance linearly varies in the curve shown in FIG. 8, the reflectivity in the center region of the reflective plate 3 may be different from the reflectivity in the peripheral region of the reflective plate 3.

Furthermore, the reflection pattern, formed by the reflective plate 3 when the reflective plate 3 reflects the light from the light-emitting element to form a light spot on the light-receiving surface of the photodiodes PD1 to PD4, may have a variable reflectivity distribution where the reflectivity varies from the center region toward the peripheral region of the reflective plate 3.

Figure 9A:
FIG. 9A is a view illustrating an exemplary disposition of a reflective plate 3.
Figure 9B:
FIG. 9B is a diagram illustrating a normal reflection pattern.
Figure 9C:
FIG. 9C is a diagram illustrating a reflection pattern where the reflectivity in the center region of the reflective plate 3 is different from the reflectivity in the peripheral region of the reflective plate 3.

FIG. 9A illustrates an exemplary disposition of the reflective plate 3, FIG. 9B illustrates a normal reflection pattern, and FIG. 9C illustrates a reflection pattern where the reflectivity in the center region of the reflective plate 3 is different from the reflectivity in the peripheral region of the reflective plate 3.

Figure 10:
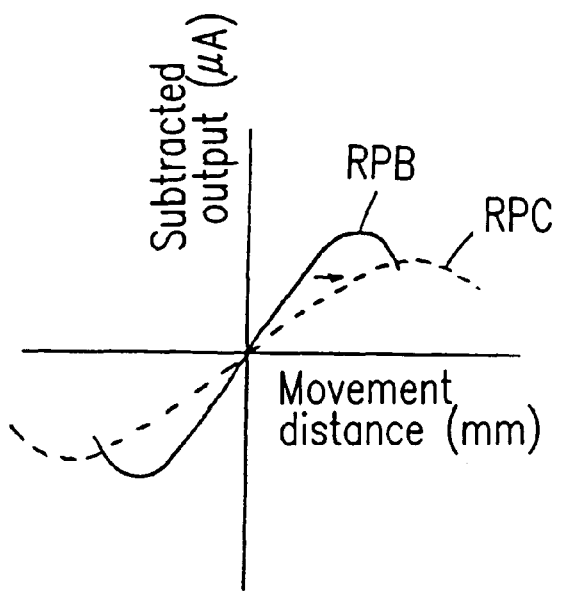
FIG. 10 is a graph illustrating relationships between the subtracted outputs and the movement distances for the reflection patterns shown in FIGS. 9B and 9C, respectively.
Figure 11:
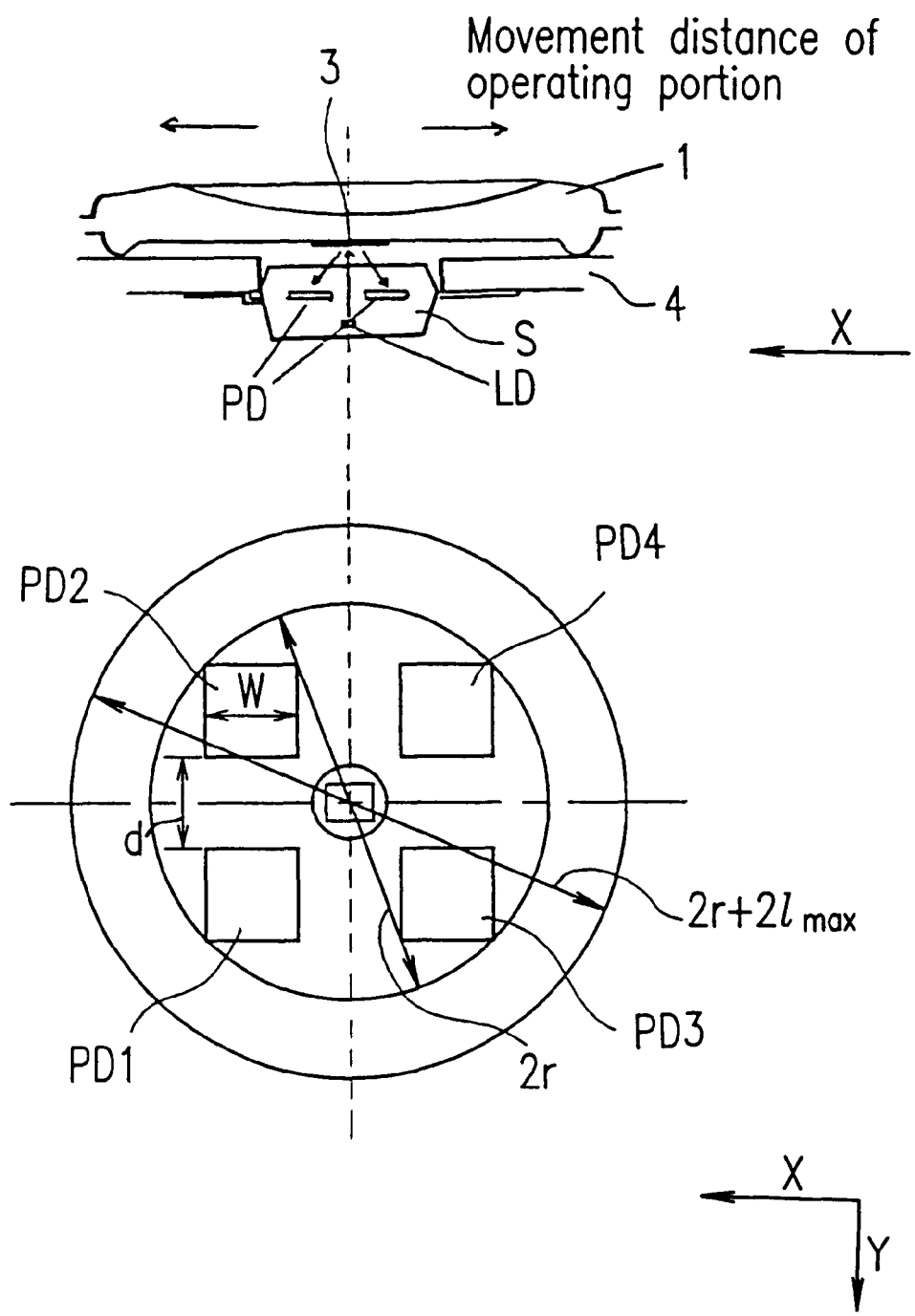
FIG. 11 shows a cross-sectional view and a plan view for exemplifying an optimum diameter of a light spot.

FIG. 10 illustrates the relationships between the subtracted output and the movement distance for the reflection patterns shown in FIGS. 9B and 9C, respectively. As shown in FIG. 10, in the case of the reflection pattern RPC shown in FIG. 9C, the region where the relationship between the subtracted output and the movement distance linearly varies is wider than that of the reflection pattern RPB shown in FIG. 9B. Thus, even when the operating portion 1 is moved over a long distance, the detection precision does not deteriorate. As a result, the operating performance of the operating portion 1 is improved.

The below-described relationship is required to be satisfied by the size of the reflective plate 3, the movement distance of the operating portion 1 and chip of the light-receiving elements, in order to obtain X and Y data in the two-dimensional directions. The relationship will be described with reference to FIG. 11.

The maximum distance over which the operating portion 1 can move, i.e., the maximum distance over which the reflective plate 3, moving together with the operating portion 1, can move in the X direction from the center portion will be denoted by $l_{max}$. The radius of the circle encircling and inscribing the four photodiodes PD1 to PD4 will be denoted by r. The spot diameter of the light which has been reflected by the reflective plate 3 and received by the photodiodes PD1 to PD4 on the same plane will be denoted by x. And the gap between two adjacent ones of the photodiodes PD1 to PD4 will be denoted by d. For example, d may be a distance between the photo-diode PD1 and the photodiode PD2. W is the width of the photodiode.

The spot diameter x of the reflected light is determined so as to satisfy the following relationship (3).

$$d \leq x \leq 2r + 2l_{max} \quad (3)$$

Figure 12A:
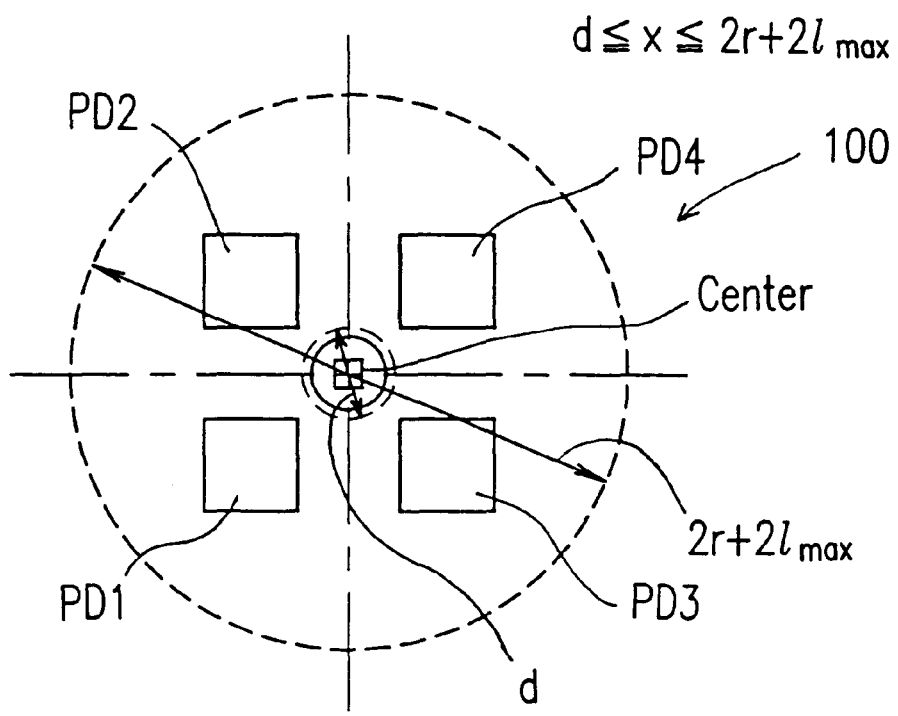
FIG. 12A is a diagram illustrating how photodiodes PD1 to PD4 detect the light reflected by the reflective plate 3 on a plane 100.
Figure 12B:
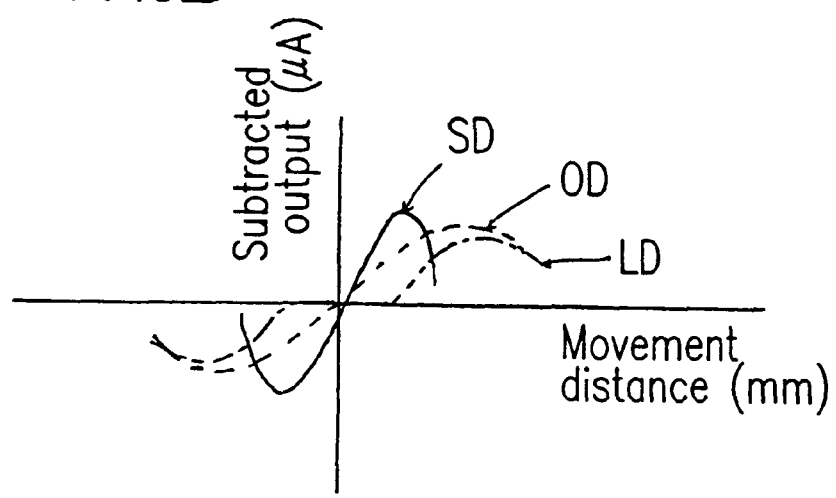
FIG. 12B is a graph illustrating relationships between the movement distances of the operating portion 1 and the subtracted outputs for the light spots of various sizes of the reflected light.

FIG. 12A illustrates how the photodiodes PD1 to PD4 detect the light reflected by the reflective plate 3 on the plane 100. FIG. 12B illustrates the relationships between the movement distance of the operating portion 1 and the subtracted output for the light spots of various sizes of the reflected light. If the spot diameter of the reflected light is small (for example, if d<x), the region where the relationship between the movement distance and the subtracted output linearly varies becomes narrow as indicated by the curve SD. On the other hand, if the spot diameter of the reflected light is large (for example, when $x<2r+2l_{max}$), there appears a flat region where no subtracted output is obtained when the operating portion 1 is located near the center region as indicated by the curve LD. In order to realize optimum characteristics for the subtracted output as indicated by the curve OD, the input device of the present invention is required to satisfy the relationship (3). In order to satisfy the relationship (3), the size of the reflective plane, the light-emitting element and/or the reflective plane, the light-emitting element and the photodiodes are adjusted.

If the operating performance of the operating portion 1 (i.e., the pointing device) is to be improved, then it is necessary to construct the pointing device such that the force, applied by an operator with the tip of a finger placed on the operating portion 1, is easily transmitted to the operating portion 1. In other words, the operating portion 1 is required to be configured so that the finger tip does not slip on the surface of the operating portion 1. Hereinafter, various examples of the operating portion 1 will be described.

OPERATING PORTION EXAMPLE 1

Figure 13:
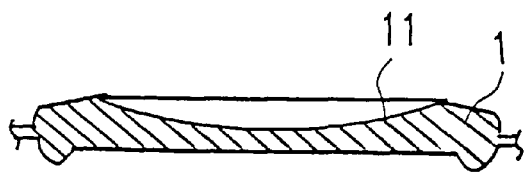
FIG. 13 is a cross-sectional view illustrating the operating portion of the input device according to operating portion Example 1.

FIG. 13 illustrates the operating portion 1 of the input device according to operating portion example 1. The operating portion 1 includes a concave portion 11 in the upper surface thereof onto which the tip of a finger is placed, in the same way as the operating portion 1 shown in FIG. 1. In such a configuration, a force easily can be applied with certainty onto the operating portion 1, thereby improving the operating performance of the operating portion 1.

OPERATING PORTION EXAMPLE 2

Figure 14:
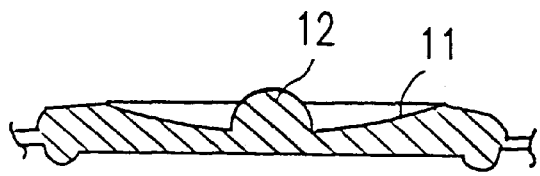
FIG. 14 is a cross-sectional view illustrating the operating portion of the input device according to operating portion Example 2.

FIG. 14 illustrates the operating portion 1 according to operating portion Example 2. The operating portion 1 includes: a concave portion 11 in the upper surface thereof; and a protrusion 12 formed within the concave portion 11. In such a configuration, a force easily can be applied with certainty onto the operating portion 1, thereby improving the operating performance of the operating portion 1, in the same way as the operating portion 1 shown in FIG. 13.

OPERATING PORTION EXAMPLE 3

Figure 15:
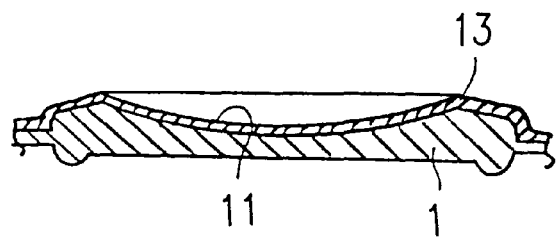
FIG. 15 is a cross-sectional view illustrating the operating portion of the input device according to operating portion Example 3.

FIG. 15 illustrates the operating portion 1 according to operating portion Example 3. The operating portion 1 includes: a concave portion 11 in the upper surface thereof; and a film 13, which is made of a different material from that of the operating portion 1, has an excellent anti-slipping property or has excellent durability and environment resistance, and is formed over the entire upper surface of the operating portion 1 so as to cover the concave portion 11. In such a configuration, a force easily can be applied with certainty onto the operating portion 1, thereby improving the operating performance of the operating portion 1, in the same way as the operating portion 1 shown in FIG. 13 or 14.

OPERATING PORTION EXAMPLE 4

Figure 16:
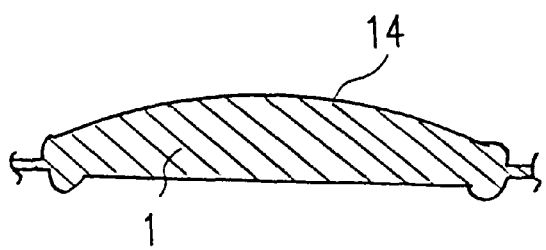
FIG. 16 is a cross-sectional view illustrating the operating portion of the input device according to operating portion Example 4.

FIG. 16 illustrates the operating portion 1 according to operating portion Example 4. The operating portion 1 has a convex upper surface 14. In such a configuration, a force easily can be applied with certainty onto the operating portion 1, thereby improving the operating performance of the operating portion 1, in the same way as the operating portion 1 shown in FIGS. 13, 14 or 15.

OPERATING PORTION EXAMPLE 5

Figure 17:
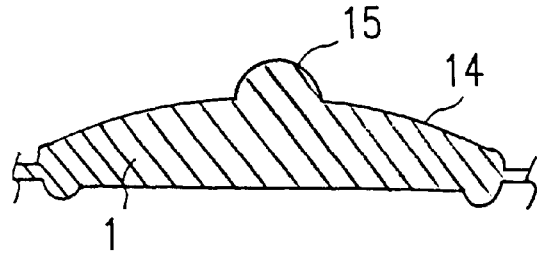
FIG. 17 is a cross-sectional view illustrating the operating portion of the input device according to operating portion Example 5.

FIG. 17 illustrates the operating portion 1 according to operating portion Example 5. The operating portion 1 includes a convex upper surface 14 and a protrusion 15 formed on the convex upper surface 14. In such a configuration, a force easily can be applied with certainty onto the operating portion 1, thereby improving the operating performance of the operating portion 1, in the same way as the operating portion 1 shown in FIGS. 13, 14, 15 or 16.

OPERATING PORTION EXAMPLE 6

Figure 18:
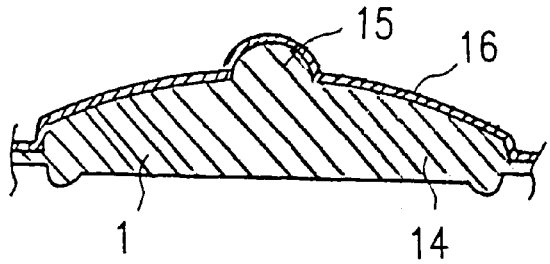
FIG. 18 is a cross-sectional view illustrating the operating portion of the input device according to operating portion Example 6.

FIG. 18 illustrates the operating portion 1 according to operating portion Example 6. The operating portion 1 includes: a convex upper surface 14; a protrusion 15 formed on the convex upper surface 14; and a film 16, which is made of a different material from that of the operating portion 1, has an excellent anti-slipping property or has excellent durability and environment resistance, and is formed over the entire upper surface 14 of the operating portion 1. In such a configuration, a force easily can be applied with certainty onto the operating portion 1, thereby improving the operating performance of the operating portion 1, in the same way as the operating portion 1 shown in FIGS. 13, 14, 15, 16 or 17.

Next, various other measures for improving the operating performance of the operating portion 1 to be operated by an operator will be described. Herein, the operating performance is improved by providing some indicator or indicia for the operating portion 1. Hereinafter, various examples thereof will be described.

Figure 19A:
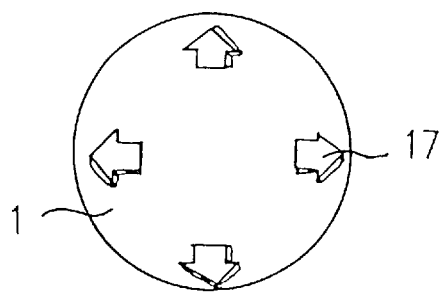
FIGS. 19A, 19B and 19C are plan views illustrating various types of marks contributing to the improvement of the operating performance of the operating portion 1.
Figure 19B:
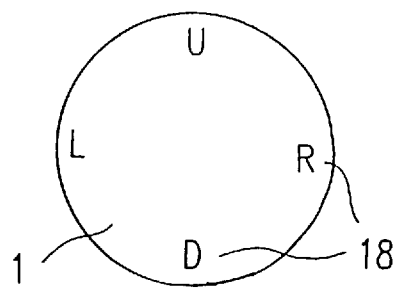
Figure 19C:
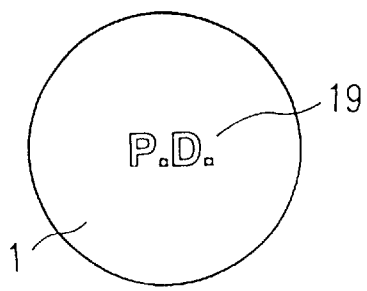

Operating portion Examples 1 to 6 of the operating portion 1 may have any of the marks or indicia shown in FIGS. 19A, 19B and 19C.

FIGS. 19A, 19B and 19C show various marks contributing to the improvement of the operating performance of the operating portion 1.

In FIG. 19A, four arrow indicators 17 indicating the operating directions of the operating portion 1 are provided for the upper surface of the operating portion 1 at four positions dividing the circumference of the operating portion 1 into four equal parts. Specifically, the indicators 17 may be formed in a convex shape or a concave shape when the operating portion 1 is molded from a resin.

In FIG. 19B, four character indicators 18 (U (up), D (down), L (left) and R (right)) indicating the operating directions of the operating portion 1 are provided for the operating portion 1. These indicators 18 are formed as convex or concave characters when the operating portion 1 is molded from a resin. Alternatively, the indicators 18 may be pictures, patterns or the like, instead of characters. These characters, pictures and/or patterns may be colored.

In FIG. 19C, an indicator "P.D. (pointing device)" 19 indicating that the operating portion 1 is a pointing device is provided for the operating portion 1. This indicator 19 is also formed as convex or concave characters when the operating portion 1 is molded from a resin. Alternatively, a picture or a pattern indicating that the input device of the present invention is a pointing device may be provided for the operating portion 1, instead of the characters 19. The characters, the picture and/or the pattern may be colored.

Next, various examples of the method for fabricating the input device of the present invention and exemplary structures for realizing an excellent dustproof property, reliability and environment resistance will be described.

Examples of Fabrication Method and Structures

FIGS. 20A to 20E illustrate various examples of the input device of the present invention.

Figure 20A:
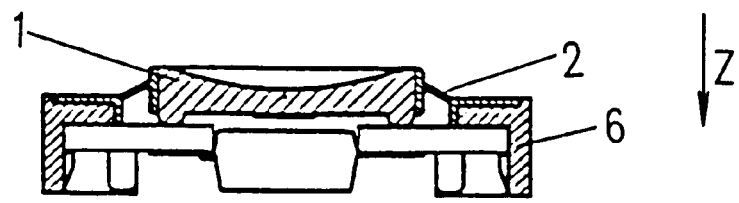
FIGS. 20A to 20E are cross-sectional views illustrating various configurations including the elastic structure 2, the operating portion 1 and the fixing portion 6.

In FIG. 20A, the elastic structure 2, the operating portion 1 and the fixing portion 6 are molded by an insert molding technique or a two-color molding technique. The elastic structure 2, the operating portion 1 and the fixing portion 6 form a hermetic structure under the upper surface of the operating portion 1 (in the Z-axis direction). Such a structure can inhibit or prevent dust from penetrating from over the upper surface of the operating portion 1 and deteriorating the operating performance of the input device. Since the upper surface of the input device, from which dust is ordinarily likely to penetrate, is hermetic, the reliability (environment resistance) of the input device is improved.

Figure 20B:
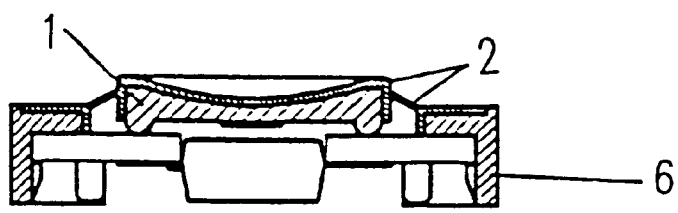

In FIG. 20B, when the elastic structure 2, the operating portion 1 and the fixing portion 6 are molded by an insert molding technique or a two-color molding technique, the upper surface of the operating portion 1 is partially or entirely covered with a film made of the same material as that of the elastic structure 2. Thus, the elastic structure 2, the operating portion 1 and the fixing portion 6 form a hermetic structure under the upper surface of the operating portion 1 (in the Z-axis direction).

Figure 20C:
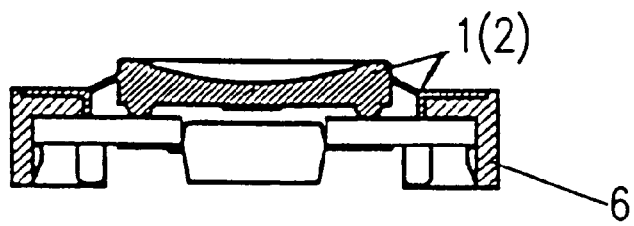

In FIG. 20C, when the elastic structure 2, the operating portion 1 and the fixing portion 6 are molded by an insert molding technique or a two-color molding technique, the operating portion 1 is made of the same material as that of the elastic structure 2. In such an example, since the fabrication process and the resulting structure are simplified, the costs can be reduced correspondingly. When the elastic structure 2, the operating portion 1 and the fixing portion 6 form a hermetic structure under the upper surface of the operating portion 1 (in the Z-axis direction), it is possible to inhibit or prevent dust from penetrating from over the upper surface of the input device.

Figure 20D:
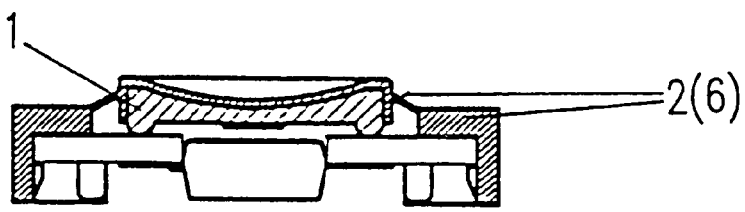

In FIG. 20D, when the elastic structure 2, the operating portion 1 and the fixing portion 6 are molded by an insert molding technique or a two-color molding technique, the fixing portion 6 is made of the same material as that of the elastic structure 2. In such an example, since the fabrication process and the resulting structure are simplified, the costs can be reduced correspondingly. When the elastic structure 2, the operating portion 1 and the fixing portion 6 form a hermetic structure under the upper surface of the operating portion 1 (in the Z-axis direction), it is possible to inhibit or prevent dust from penetrating from over the upper surface of the input device.

Figure 20E:
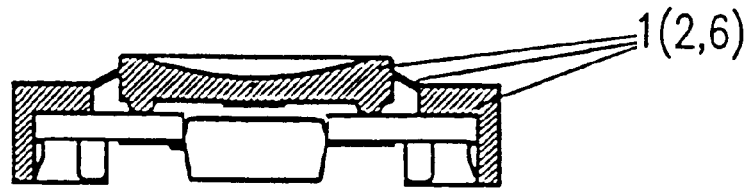

In FIG. 20E, when the elastic structure 2, the operating portion 1 and the fixing portion 6 are molded by an insert molding technique or a two-color molding technique, the operating portion 1 and the fixing portion 6 are made of the same material as that of the elastic structure 2. In such an example, since the fabrication process and the resulting structure are further simplified, the costs can be further reduced correspondingly.

Examples Characterized by Positional Relationship and Structure of the Elastic Structure, the Operating Portion and the Fixing Portion FIG. 21A illustrates an assembly including in which the elastic structure 2, the operating portion 1 and the fixing portion 6. FIG. 21B illustrates the appearance of the input device after the base 4 has been attached to the assembly shown in FIG. 21A.

When the assembly shown in FIG. 21A is attached to the base 4, the operating portion 1 comes into contact with the base 4 in accordance with the amount of force applied by the elastic structure 2. When the force applied by the elastic structure 2 is strong, the operating portion 1 is pressed against the base 4. However, in the structure shown in FIG. 21B, the operating portion 1 can return to the initial position thereof. In addition, if the elastic structure 2 has some rubber elasticity in the structure shown in FIG. 21B, the elastic structure 2 may be operated stably.

In this example, neither backlash nor lifting is caused between the operating portion 1 and the fixing portion 6. Thus, no assembly defect is caused when the input device is constructed. As a result, the assembly precision and performance can be improved.

Next, various examples for improving the operating performance of the operating portion 1 and for enabling a smooth sliding of the operating portion 1, in particular, will be described.

IMPROVED SLIDABILITY EXAMPLE 1

Figure 22A:
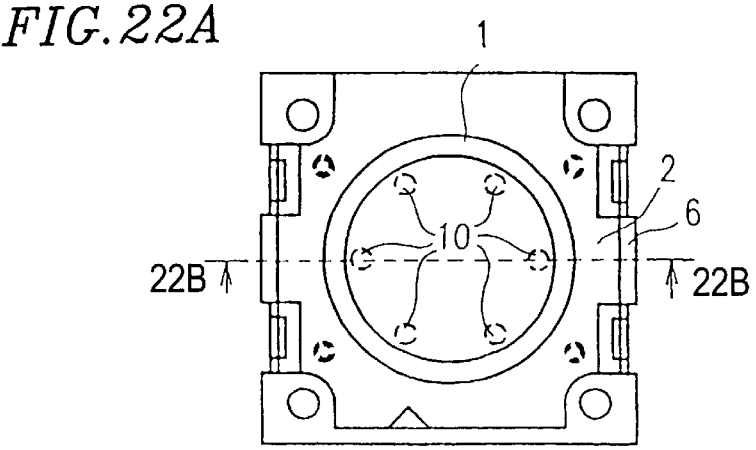
FIG. 22A is a plan view illustrating an assembly in which the elastic structure 2, the operating portion 1 and the fixing portion 6 have been assembled.
Figure 22B:
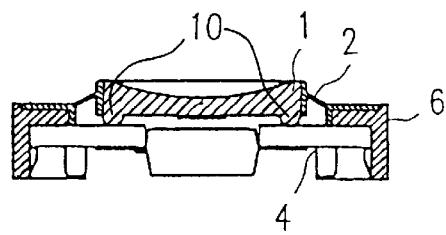
FIG. 22B is a cross-sectional view taken along the broken line B—B of the assembly shown in FIG. 22A.

FIG. 22A is a plan view illustrating the assembly in which the elastic structure 2, the operating portion 1 and the fixing portion 6 have been formed. FIG. 22B is a cross-sectional view taken along the line B—B of the assembly shown in FIG. 22A.

At least three (six in FIGS. 22A and 22B) spherical or hemispherical protrusions 10 are formed on the lower surface of the operating portion 1 so as to come into contact with the sliding surface which is the upper surface of the base 4.

Since the operating portion 1 and the base 4 come into contact with each other via these points, the friction resistance or the sliding resistance between the operating portion 1 and the base 4 can be reduced. As a result, the operating performance of the operating portion 1 is improved.

The shape of the protrusion 10 is not limited to a sphere or hemisphere but may be any arbitrary shape so long as the protrusion 10 comes into contact with the base 4 via a small number of points.

IMPROVED SLIDABILITY EXAMPLE 2

Figure 23A:
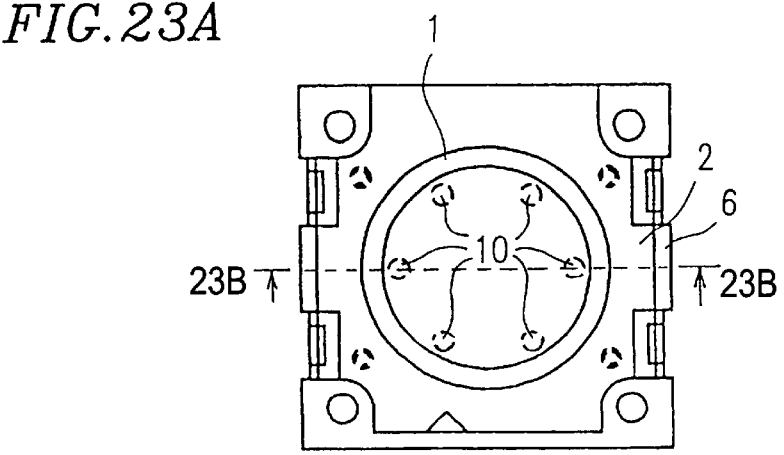
FIG. 23A is a plan view illustrating an assembly in which the elastic structure 2, the operating portion 1 and the fixing portion 6 have been assembled.
Figure 23B:
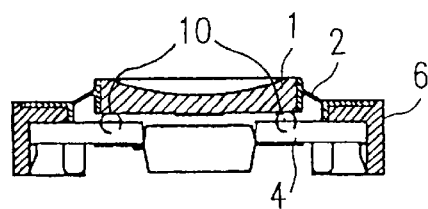
FIG. 23B is a cross-sectional view taken along the broken line C—C of the assembly shown in FIG. 23A.

FIG. 23A is a plan view illustrating the assembly in which the elastic structure 2, the operating portion 1 and the fixing portion 6 have been formed. FIG. 23B is a cross-sectional view taken along the line C—C of the assembly shown in FIG. 23A.

Though the protrusions 10 are provided on the lower surface of the operating portion 1 in the input device shown in FIG. 22A, the protrusions 10 are provided on the upper surface of the base 4 in the input device shown in FIG. 23A. At least three (six in FIGS. 23A and 23B) spherical or hemispherical protrusions 10 are formed on the upper surface of the base 4 so as to come into contact with the slide surface which is the lower surface of the operating portion 1.

IMPROVED SLIDABILITY EXAMPLE 3

FIG. 24 illustrates the features of the assembly in Example 3 for improving the slidability of the operating portion 1. In Example 3, a sheet shaped flat plate 20 is formed on the upper surface of the base 4 in order to smoothly sliding the operating portion 1, which is made of a material having a small friction resistance, between the operating portion 1 and the base 4.

IMPROVING SLIDABILITY EXAMPLE 4

FIG. 25 is a cross-sectional view of the assembly in which the elastic structure 2, the operating portion 1 and the fixing portion 6 have been formed.

In Example 4, a lubricant 21 for smoothly sliding the operating portion 1 is applied between the operating portion 1 and the base 4. Since the slide resistance of the operating portion 1 can be further reduced by this example, the operating performance of the operating portion 1 can be further improved. It is noted that the lubricant 21 may be applied between the operating portion 1 and the base 4 in any of improved slidability Examples 1 to 3 for improving the slidability of the operating portion 1.

Example for Restricting Movement Amount of Operating Portion and for Preventing Fracture of Elastic Structure FIG. 26A is a plan view illustrating the assembly in which the elastic structure 2, the operating portion 1 and the fixing portion 6 have been formed. FIG. 26B is a cross-sectional view taken along the line D—D of the assembly shown in FIG. 26A.

The input device of this example includes stopper members 22 for restricting the range through which the operating portion 1 can move. Thus, it is possible to prevent the elastic structure 2 from being fractured by the movement of the operating portion 1. Hereinafter, a specific example thereof will be described.

The fixing portion 6 includes sides which can come into contact with the operating portion 1. Ring-shaped stopper members 22 are disposed in the vicinity of the sides of the fixing portion 6. Thus, the operating portion 1 does not come into direct contact with the fixing portion 6. When the operating portion 1 comes into contact with any of these stopper members 22, the movement of the operating portion 1 is stopped. After the movement of the operating portion 1 is stopped by the contact with the stopper member 22, the spring of the elastic structure 2 is not pulled any longer. Thus, it is possible to prevent the elastic structure 2 from being fractured. It is noted that the ring shaped stoppers may be provided for the side of the operating portion 1.

INPUT DEVICE EXAMPLE 2

Figure 27:
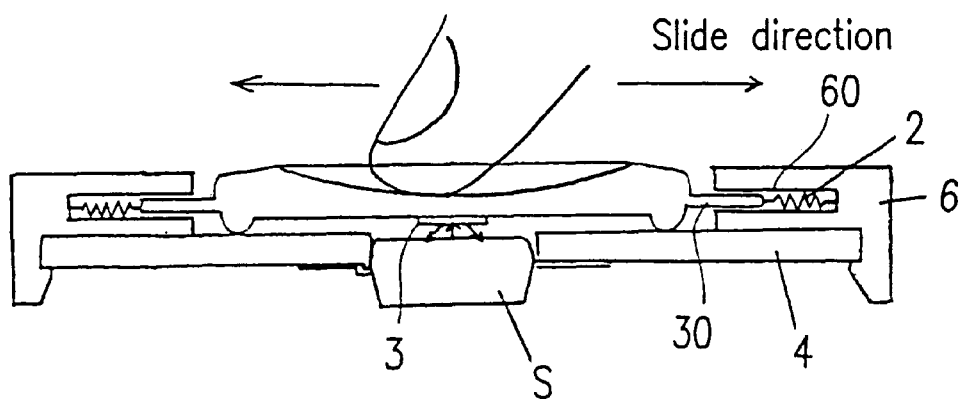
FIG. 27 is a cross-sectional view illustrating the input device of the present invention according to input device Example 2.

FIG. 27 illustrates the input device of the present invention according to input device Example 2. In Example 2, the input device of the present invention is applied to a pointing device which can perform a two-dimensional input operation.

The fixing portion 6 of the input device includes a slide portion for enabling the operating portion 1 to slide in two-dimensional directions.

As shown in FIG. 27, a slide guide groove 60 is provided for the fixing portion 6. The slide portion 30 of the operating portion 1 which is inserted into the slide guide groove 60 slides in accordance with the force applied to the operating portion 1. The elastic structure 2 of Example 2 has an elastic body such as a coil spring.

Figure 1:
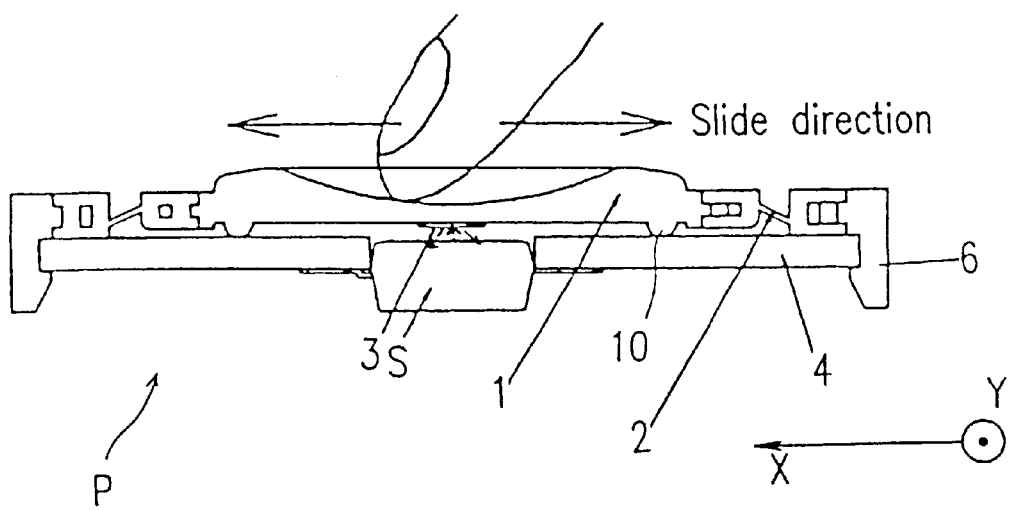
FIG. 1 is a cross-sectional view illustrating the input device of the present invention according to input device Example 1.

It is noted that the same members as those of the input device shown in FIG. 1 will be identified by the same reference numerals and the description thereof will be omitted in principle. The input device shown in FIG. 27 can attain the same effects as those attained by the input device shown in FIG. 1.

In the input device shown in FIG. 27, the operating portion 1 thereof may be modified as described in operating portion Examples 1 to 6 of the operating portion 1. Also, in the input device shown in FIG. 27, the slidability of the operating portion 1 may be improved as described in improved slidability Examples 1 to 4 for improving the slidability of the operating portion 1. Moreover, the input device shown in FIG. 27 may be modified as described in the example characterized by the positional relationship and the structures of the elastic structure 2, the operating portion 1 and the fixing portion 6. Furthermore, the input device shown in FIG. 27 may be modified as described in the example for restricting the movement amount of the operating portion 1 and for preventing the fracture of the elastic structure 2. Optionally, the input device shown in FIG. 27 may be subject to a part or all of the above-described modifications.

INPUT DEVICE EXAMPLE 3

Figure 28:
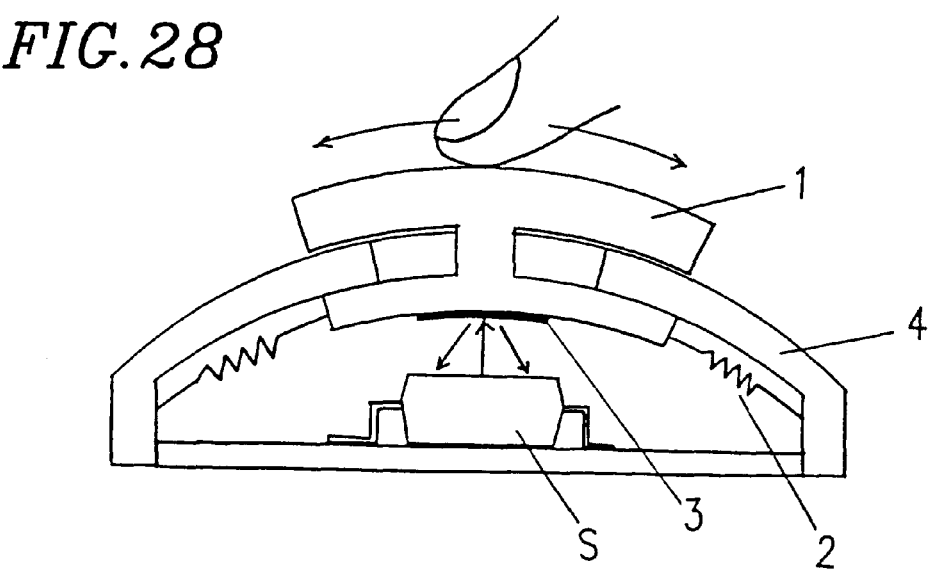
FIG. 28 is a cross-sectional view illustrating the input device of the present invention according to input device Example 3.

FIG. 28 illustrates the input device of the present invention according to input device Example 3. In Example 3, the input device of the present invention is applied to a pointing device which can perform a two-dimensional input operation.

The input device of Example 3 has substantially the same configuration as that of the input device of input device Example 1 or 2, except that the operating portion 1 is attached to a base having a curvature so as to be able to slide thereon.

As shown in FIG. 28, when the base 4 is seen at the front, the base 4 has an arch shape with an upwardly convex center portion. The operating portion 1 has an I-shape when it is seen at the front and is attached to the base 4 so as to be able to slide in any of the forward, backward, leftward and rightward directions in FIG. 28.

The same members as those of the input device Example 1 or 2 will be identified by the same reference numerals and the detailed description thereof will be omitted herein.

In the input device shown in FIG. 28, the operating portion 1 thereof may be modified as described in operating portion Examples 1 to 6 of the operating portion 1. Also, in the input device shown in FIG. 28, the slidability of the operating portion 1 may be improved as described in improved slidability Examples 1 to 4 for improving the slidability of the operating portion 1. Moreover, the input device shown in FIG. 28 may be modified as described in the example characterized by the positional relationship and the structures of the elastic structure 2, the operating portion 1 and the fixing portion 6. Furthermore, the input device shown in FIG. 28 may be modified as described in the example for restricting the movement amount of the operating portion 1 and for preventing the fracture of the elastic structure 2. Optionally, the input device shown in FIG. 28 may be subject to a part or all of the above-described modifications.

In order for the input device shown in FIG. 28 to maintain sufficient linearity in the relationship between the subtracted output and the movement distance, the radius of curvature of the base 4 is preferably set at a sufficiently large value as shown in FIG. 28, and the variation in outputs caused by the variation of the reflection angle of the reflective surface is preferably smaller than the variation in outputs caused by the movement on the reflective surface.

INPUT DEVICE EXAMPLE 4

Figure 29A:
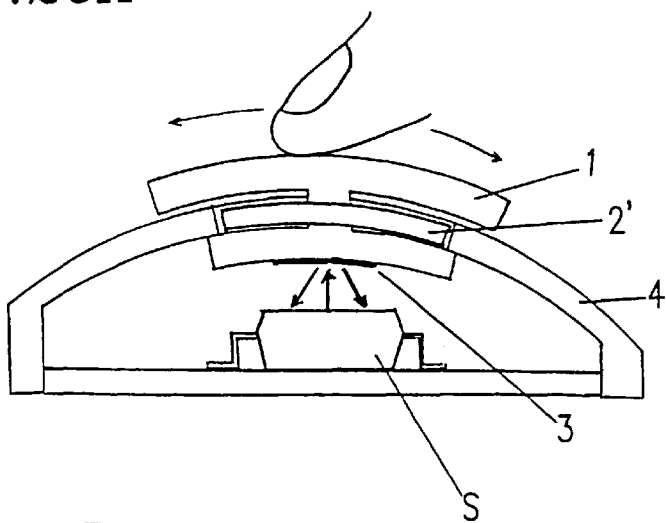
FIG. 29A is a cross-sectional view illustrating the input device of the present invention according to input device Example 4.
Figure 29B:
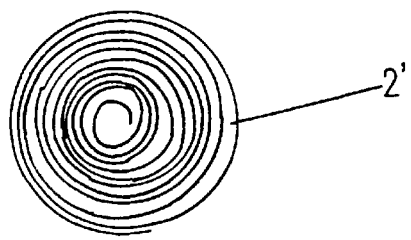
FIG. 29B is a view illustrating a spiral spring 2'.

FIG. 29A is a cross-sectional view of the input device of the present invention according to input device Example 4. FIG. 29B illustrates a spiral spring 2'.

The input device of input device Example 4 has the same configuration as that of the input device shown in FIG. 28 except for the elastic structure. In input device Example 4, the concentric spiral spring 2' shown in FIG. 29B is used as an elastic body for elastically supporting the operating portion 1.

Figure 30A:
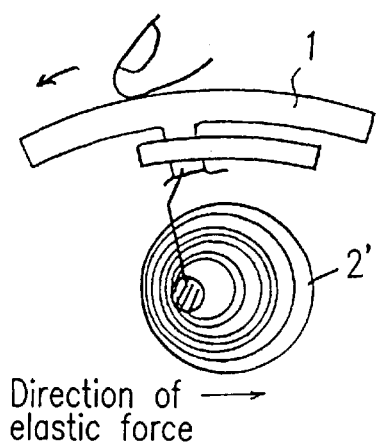
FIGS. 30A and 30B are views illustrating the spiral spring 2' connected to the operating portion 1.
Figure 30B:
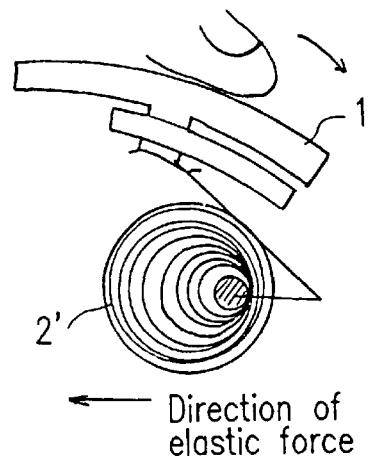
Figure 34:
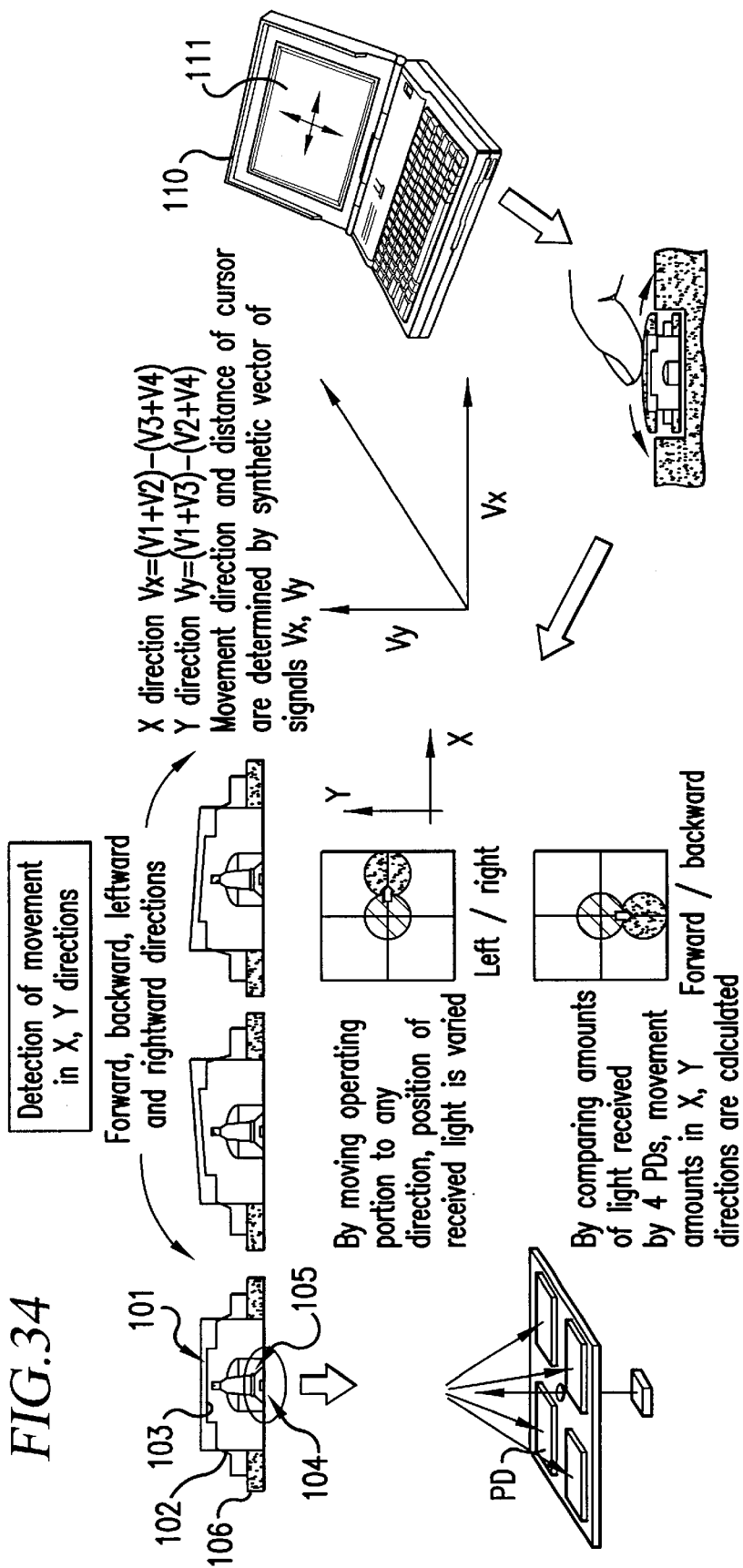
FIG. 34 is an illustrative drawing explaining the detection principle of a pointing device which can perform a two-dimensional input operation.
Figure 35:
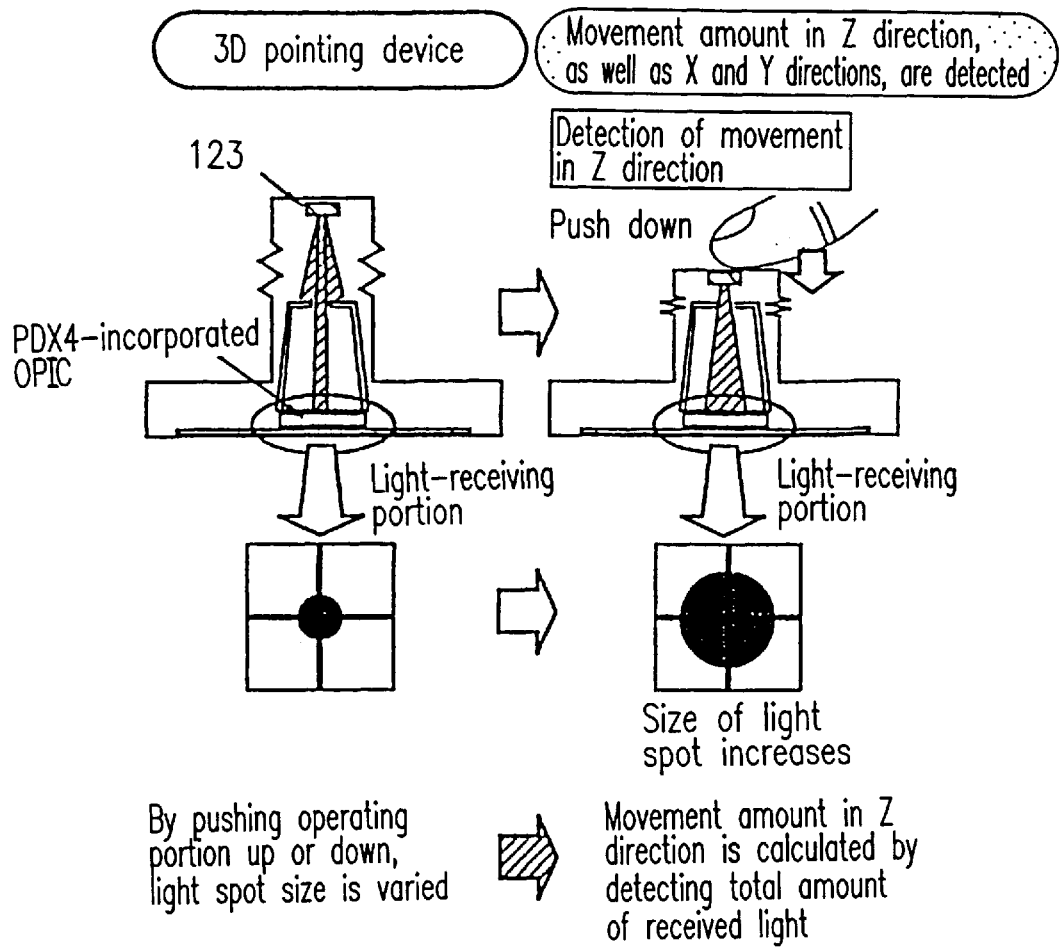
FIG. 35 is an illustrative drawing explaining the detection principle of a pointing device which can perform a three-dimensional input operation.

FIGS. 30A and 30B illustrate the spiral spring 2' connected to the operating portion 1, showing how the spiral spring 2' is deformed by the displacement of the operating portion 1 and applies a restoring force to the operating portion 1.

The same members as those of the input device shown in FIG. 28 will be identified by the same reference numerals and the detailed description thereof will be omitted in the input device of input device Example 4.

If the radius of curvature of the base 4 is small and the angular movement direction of the light spot is reversed from the movement direction shown in FIGS. 7A and 7B in input device Examples 3 and 4, the detection principle disclosed in Japanese Patent Application No. 8-75008 filed by the present applicant may be applied.

INPUT DEVICE EXAMPLE 5

FIGS. 31 and 32A illustrate input device Example 5 of the input device of the present invention. The input device of input device Example 5 can perform a three-dimensional input operation.

As shown in FIG. 31, the input device of input device Example 5 includes a pressure-sensitive sensor 40 for detecting a force applied in the Z direction, in addition to the members of the input device for two-dimensional detection. In this example, in order to detect a force applied in the Z direction, the pressure-sensitive sensor 40 may be disposed between the flat plate shaped sheet 41 constituting a slide surface (see FIG. 33) and the base 4, may be disposed on the upper surface or the lower surface of the base 4 or may be disposed on the upper surface of the operating portion 1.

The same members as those of the input device for the two-dimensional detection (e.g., the input device shown in FIG. 1) will be identified by the same reference numerals and the detailed description thereof will be omitted in principle in the input device of input device Example 5.

The input device of input device Example 5 can input two-dimensional data to a computer in the same way as the input device for the two-dimensional detection (e.g., the input device shown in FIG. 1). Thus, the input device of input device Example 5 can point to the position of an object which is two-dimensionally displayed on the screen by a computer. Furthermore, since the input device of input device Example 5 includes a pressure-sensitive sensor 40 for detecting a force applied in the Z direction, three-dimensional data may also be input to the computer. Thus, the input device of input device Example 5 can point to the position of an object which is three-dimensionally displayed on the screen by the computer.

A sensor of a pressure-sensitive resistive type or a sensor called a "distortion gauge" may be used as the pressure-sensitive sensor 40. In either case, the sensor utilizes physical properties for varying a resistance value in accordance with a force applied to the sensor.

An exemplary configuration of the input device including a pressure-sensitive sensor 40 of a pressure-sensitive resistive type is shown in FIG. 32A. A relationship between the load applied onto the operating portion 1 of the input device shown in FIG. 32A and an output voltage resulting from the application of a voltage to the sensor is shown in FIG. 32B. As shown in FIG. 32B, the resulting output (output voltage) exhibits a linear characteristic with respect to a load within a prescribed range.

Since the two-dimensional input operation (in the X and Y directions) is performed in an optical slide manner, the tensile strength of the elastic structure 2 is set at such a value as to move the elastic structure 2 upon the application of a small force.

In performing an input operation in the Z direction, if the force applied in the Z direction is stronger than the force required to perform a two-dimensional input operation, a pressure sensitive region of the pressure-sensitive sensor 40 is used which is able to recognize the input in the Z direction is used.

For example, if the force required for performing the two-dimensional input operation is in the range from about 0 to about 50 gf (=about 0.49 N), then the force required for performing the input operation in the Z direction is set to be equal to or larger than about 50 gf (=about 0.49 N). In such a case, the pressure-sensitive sensor 40 is designed so as to detect a force of 50 gf (=about 0.49 N) or more.

The pressure-sensitive sensor 40 or the sensor S for detecting a force in the Z direction may process a signal for the Z direction. In response to the processed signal for the Z direction, the two-dimensional data input to the computer may be corrected and the movement of a cursor or the like of a display device may be controlled. By performing such a correction, the cursor can be finely moved and an input operation satisfying the human sense can be performed.

In input device Example 5, when the cursor is moved two-dimensionally, the movement amount and the movement speed of the cursor may be increased in accordance with the magnitude of the force applied in the Z direction. For example, in the case of processing serial data of a PS/2 mouse interface, the number of dots of the X- and Y-movement data, which is ordinarily composed of three bytes, may be increased for increasing the movement amount and accelerating the movement speed. Alternatively, the interval between the transmission times of the X- and Y-movement data, which is ordinarily composed of three bytes, may be shortened, thereby accelerating the apparent movement speed.

In the illustrated example, the present invention is applied to an input device including an operating portion 1 which slides on a plane. Alternatively, the present invention is also applicable to an input device including an operating portion which slides on a surface having a curvature. Furthermore, the above-described examples such as the example for improving the slidability of the operating portion 1 are applicable to the pointing device of input device Example 5.

The input device of input device Example 5 detects an input in two-dimensional directions and an input in the Z direction in accordance with detection methods using different detection means. Thus, it is possible to perform an input operation in the two-dimensional directions and an input operation in the Z direction by distinguishing these operations from each other based on the human sense. As a result, by using the input device of input device Example 5, even a child or an old man can perform a three-dimensional input operation with ease.

INPUT DEVICE EXAMPLE 6

FIG. 33 illustrates the input device of the present invention according to input device Example 6. The input device of input device Example 6 can perform a three-dimensional input operation.

In input device Example 6, the movement amount is decreased and the movement speed is decelerated or the operating portion i is braked in accordance with the force applied in the Z direction, as opposed to input device Example 5. In input device Example 6, in order to detect the force applied in the Z direction, the pressure-sensitive sensor 40 may be disposed between the flat plate shaped sheet 41 constituting a slide surface and the base 4, may be disposed on the upper surface or the lower surface of the base 4 or may be disposed at the contact region between the operating portion 1 and the base 4.

Note that the operating portion 1 may be moved in an accelerative manner in input device Examples 5 and 6.

Figure 36:
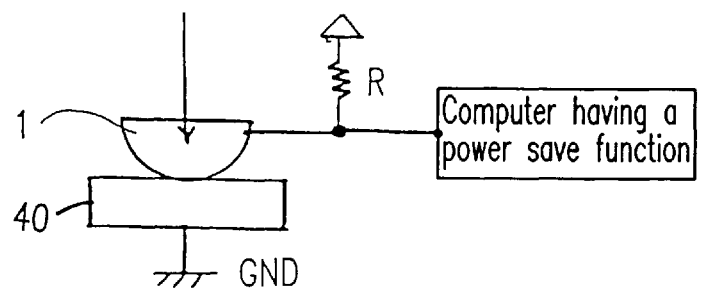
FIG. 36 is a schematic circuit diagram illustrating the input device shown in FIG. 31 or 33 with a computer having a power save function.

FIG. 36 illustrates the input device shown in FIG. 31 or 33 and a computer having a power save function. The pressure-sensitive sensor 40 detects a force applied in the Z direction and outputs the detected force as a start signal for starting to operate the input device as a pointing device to the computer having a power save function. By utilizing such a system, the power consumption of a computer and a monitor connected to the computer can be minimized.

The input device of the present invention is an optical input device of a non-contact type, and thus has excellent durability. In addition, the input device has excellent reliability (or environment resistance).

Moreover, the movable body (i.e., the operating portion) can slide two-dimensionally (i.e., in the X and Y directions). Thus, as compared with an input device rocking in the vertical direction, the input device (i.e., the pointing device) can be downsized with a reduced thickness.

Furthermore, in the input device of the present invention, the reflective surface moves with the movable body (i.e., the operating portion) and is disposed so as to face the light-emitting element and the light-receiving elements. Since an appropriate pattern is selected as the reflection pattern thereof, a pointing device exhibiting linear detection characteristics over a wide range with respect to the displacement easily can be realized. As a result, an input device which can perform a two-dimensional input operation with improved detection precision and enhanced operating performance can be realized.

Furthermore, in the operating portion of the input device of the present invention, the tip of an operator's finger does not slip on the operating portion. Thus, the operator can easily apply force with certainty to the operating portion. As a result, the operating performance is further improved.

Moreover, in the input device of the present invention, since the indicators instructing the operating directions and the like are provided for the operating portion by using colored marks, pictures or the like, the operator is much less likely to perform an erroneous operation. As a result, the operating performance is further improved.

In addition, in the input device of the present invention, since the elastic structure, the operating portion and the fixing portion are formed by an insert molding technique, a two-color molding technique or the like so as to realize a hermetic structure under the surface of the operating portion, a dustproof construction is realized. As a result, the reliability (environment resistance) of the input device can be improved.

Furthermore, in the input device of the present invention, since the elastic structure, the operating portion and the fixing portion are positioned and configured to satisfy such a positional relationship that the operating portion comes into contact with or is pressed against the base by the force applied by the elastic structure when the elastic structure, the operating portion and the fixing portion are fixed onto the base, various assembly defects such as backlash and lifting of the operating portion and the fixing portion can be minimized or eliminated. As a result, the assembly precision can be improved and the costs can be reduced.

Moreover, in the input device of the present invention, since the movable body (i.e., the operating portion) and the base are in contact with each other via at least three spherical or hemispherical protrusions, the slide resistance of the operating portion against the base can be reduced. As a result, the operating performance is further improved.

Furthermore, in the input device of the present invention, since a sheet-shaped flat plate is provided or a lubricant is applied between the operating portion and the base for smoothly sliding the operating portion, the slide resistance can be further reduced. As a result, the operating performance is further improved.

Moreover, in the input device of the present invention, since a pressure-sensitive sensor for detecting a force applied in the Z-axis direction which is applied onto the movable body (i.e., the operating portion) is further provided, it is possible to realize an input device which can perform a three-dimensional input operation while attaining all the effects of the input device for the two-dimensional input operation. In such a case, since the pressure-sensitive sensor can precisely detect a force applied in the Z-axis direction, it is not necessary to perform a subtle input operation in the Z direction while relying on the human sense of touch or subtly pushing down the operating portion with the tip of a finger. Thus, since such an operation requires no special training, even a child or an old man can easily perform a three-dimensional input operation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:
1. An input device comprising:
a base having a slide surface;
a movable body slidable on the slide surface;
a light-emitting element for emitting light;
a reflective portion which is provided for the movable body and has a reflective surface for reflecting the light emitted by the light-emitting element; and
a plurality of light-receiving elements for receiving the light reflected by the reflective portion; and
a fixing portion provided on the base,
wherein the movable body is supported by an elastic structure including an elastic body which expands/shrinks with a sliding of the movable body,
wherein the elastic structure is linked to the base via the fixing portion,
wherein the light-emitting element and the plurality of light-receiving elements are connected to the base, and
wherein a variation of a total amount of light received by the plurality of light-receiving elements from the light reflected by the reflective portion as the movable body, which has at least a portion thereof in contact with the slide surface and which slides on the slide surface, is detected as a direction and an amount of two-dimensional movement of the movable body.

2. An input device according to claim 1, wherein the fixing portion has a guide portion for guiding the movement of the movable body which is slidable on the slide surface.

3. An input device according to claim 1, wherein the elastic body is a spiral spring.

4. An input device according to claim 1, wherein the plurality of light-receiving elements detect the light reflected by the reflective surface onto a first plane, and wherein a spot diameter x of the light reflected by the reflective surface onto the first plane satisfies a relationship: $d \leq x \leq 2r+2l_{max}$, where d is a distance between two adjacent light-receiving elements of the plurality of light-receiving elements; r is a diameter of a circle encircling and inscribing the plurality of light-receiving elements; and $l_{max}$ is a maximum movement distance of the movable body.

5. An input device according to claim 1, wherein the reflective surface has a reflection pattern, and wherein when the reflected light is imaged by the plurality of light-receiving elements, the reflection pattern is turned into an imaging pattern which is symmetric in any of the upward, downward, leftward and rightward directions with respect to the light-receiving surfaces of the light-receiving elements.

6. An input device according to claim 1, wherein the reflective surface has a reflection pattern in which a reflectivity in a center of the reflective surface is different from a reflectivity in an outer periphery of the reflective surface.

7. An input device according to claim 1, wherein the movable body includes an operating portion to which a force is applicable by an operator.

8. An input device according to claim 7, wherein the operating portion includes at least one protrusion.

9. An input device according to claim 8, wherein the operating portion has an anti-slipping property.

10. An input device according to claim 1, wherein at least one mark indicating an operation direction of the operating portion is provided for the movable body.

11. An input device according to claim 10, wherein the mark is one of a convex one and a concave one which is formed when the movable body is molded from a resin.

12. An input device according to claim 10, wherein the mark is one of a picture, a character and a pattern.

13. An input device according to claim 1, wherein an indicator of a pointing device is provided for the movable body.

14. An input device according to claim 1, wherein the elastic structure and the movable body are molded by either one of an insert molding technique and a two-color molding technique, and form a hermetic structure under an upper surface of the movable body.

15. An input device according to claim 14, wherein when the elastic structure and the movable body are molded by either one of the insert molding technique and the two-color molding technique, at least a part of the surface of the movable body is covered with the same material as that of the elastic structure.

16. An input device according to claim 1, wherein the material of the elastic structure is the same as that of the movable body.

17. An input device according to claim 1, wherein the material of the elastic structure is the same as that of the fixing portion.

18. An input device according to claim 7, wherein the material of the elastic structure is the same as that of the operating portion.

19. An input device according to claim 1, wherein the movable body comes into contact with the base in accordance with a force applied by the elastic structure.

20. An input device according to claim 1, wherein the movable body includes at least three protrusions contacting the base, and wherein the at least three protrusions are one of spherical and hemispherical.

21. An input device according to claim 1, wherein the base includes at least three protrusions contacting the movable body, and wherein the at least three protrusions are one of spherical and hemispherical.

22. An input device according to claim 1, wherein a flat plate is provided between the movable body and the base such that the movable body smoothly slides on the base.

23. An input device according to claim 1, wherein a lubricant is applied between the movable body and the base such that the movable body smoothly slides on the base.

24. An input device according to claim 1, wherein a stopper portion for restricting the movement of the movable body is provided for the base.

25. An input device according to claim 1, wherein the movable body moves in two orthogonal directions.

26. An input device according to claim 1, further comprising a pressure-sensitive sensor for detecting a force applied to the movable body in a Z-axis direction, wherein the slide surface includes an X axis and a Y axis orthogonal to the X axis, and wherein the Z axis is orthogonal to the X axis and the Y axis.

27. An input device according to claim 26, wherein the position of an object to be displayed on a display device is controlled in response to a detection signal output by the pressure-sensitive sensor.

28. An input device according to claim 27, wherein a flat plate is disposed between the movable body and the base such that the movable body smoothly slides relative to the base, and wherein the pressure-sensitive sensor is disposed between the flat plate and the base.

29. An input device according to claim 26, wherein the pressure-sensitive sensor is disposed at a contact between the movable body and the base.

30. An input device according to claim 26, wherein the input device starts to operate as a pointing device in response to a detection signal output by the pressure-sensitive sensor.

31. An input device according to claim 1, wherein the slide surface is planar.

32. An input device according to claim 1, wherein the slide surface is curved.

33. An input device according to claim 7, wherein the operating portion is concave.

34. An input device according to claim 7, wherein the operating portion is convex.

35. An input device according to claim 10, wherein the at least one mark is colored.

36. An input device according to claim 2, wherein the elastic structure, the fixing portion and the movable body are molded by either one of an insert molding technique and a two-color molding technique, and form a hermetic structure under an upper surface of the movable body.

37. An input device according to claim 36, wherein when the elastic structure, the fixing portion and the movable body are molded by either one of the insert molding technique and the two-color molding technique, at least a part of the surface of the movable body is covered with the same material as that of the elastic structure.

38. An input device according to claim 2, wherein the movable body includes an operating portion to which a force is applicable by an operator.

39. An input device according to claim 38, wherein the material of the elastic structure is the same as that of the operating portion, and wherein the material of the elastic structure is the same as that of the fixing portion.

40. An input device according to claim 1, wherein the movable body is pressed against the base by a force applied by the elastic structure.

41. An input device according to claim 1, wherein the light-emitting element and the plurality of light-receiving element are integrally molded with the base.

42. An input device according to claim 26, wherein the base has an upper surface and a lower surface, and wherein the pressure-sensitive sensor is placed on either one of the upper surface and the lower surface of the base.

43. An input device according to claim 26, wherein the pressure-sensitive sensor is disposed on a part of the movable body which is in contact with the base.

44. An input device according to claim 30, wherein the start signal is output to a computer having a power save function.

45. An input device according to claim 1, wherein the moveable body is supported by the elastic structure at an outer periphery of the movable body.

* * * * *